United States Patent
Huang et al.

(10) Patent No.: US 12,436,201 B2
(45) Date of Patent: Oct. 7, 2025

(54) METHOD AND SYSTEM FOR EVALUATING STRENGTH OF VOLTAGE SOURCE CONVERTER (VSC)-PENETRATED POWER GRID BASED ON VOLTAGE STIFFNESS

(71) Applicant: ZHEJIANG UNIVERSITY, Hangzhou (CN)

(72) Inventors: Ying Huang, Hangzhou (CN); Guoteng Wang, Hangzhou (CN); Zheng Xu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/922,765

(22) Filed: Oct. 22, 2024

(65) Prior Publication Data
US 2025/0044371 A1    Feb. 6, 2025

Related U.S. Application Data

(63) Continuation of application No. PCT/CN2024/109279, filed on Aug. 1, 2024.

(51) Int. Cl.
G01R 31/40    (2020.01)

(52) U.S. Cl.
CPC .................. G01R 31/40 (2013.01)

(58) Field of Classification Search
CPC ....................................... G01R 31/40
See application file for complete search history.

(56) References Cited

U.S. PATENT DOCUMENTS

| | | | | |
|---|---|---|---|---|
| 8,933,572 B1 * | 1/2015 | Abdur-Rahim | ........... | F03D 7/00 290/55 |
| 9,274,161 B1 * | 3/2016 | Tatcho | .................. | G01R 31/08 |
| 2016/0308360 A1 * | 10/2016 | Oates | .................... | H02M 5/458 |

FOREIGN PATENT DOCUMENTS

| | | | | | |
|---|---|---|---|---|---|
| CN | 109167380 | A | * | 1/2019 | ............... H02J 3/16 |
| CN | 116011843 | A | | 4/2023 | |
| CN | 117767343 | A | | 3/2024 | |
| WO | WO-2022152840 | A1 | * | 7/2022 | ............... H02J 3/46 |

OTHER PUBLICATIONS

Xu Zheng, "Reasonable Definition and Calculation Method of Power Grid Strength Under the Background of New Type Power Systems", High Voltage Engineering, vol. 48, No. 10, Oct. 31, 2022, pp. 3805-3819.

* cited by examiner

*Primary Examiner* — Lisa M Caputo
*Assistant Examiner* — Nyla Gavia

(57) ABSTRACT

A method and system for evaluating strength of a voltage source converter (VSC)-penetrated power grid based on voltage stiffness are provided. First data corresponding to a to-be-analyzed power grid is acquired in real time, and processed to generate a first admittance matrix corresponding to the to-be-analyzed power grid. The first admittance matrix is processed to generate device impedance data of each VSC and a second admittance matrix corresponding to the to-be-analyzed power grid. Rows and columns where a grid-forming VSC node and a rated alternating-current (AC) bus voltage grid-following VSC node are located are removed from the second admittance matrix to generate a third admittance matrix, which is processed to generate second data and third data corresponding to the VSC node. Strength evaluation data corresponding to the to-be-ana- (Continued)

lyzed power grid is generated based on the third data in combination with the second data.

14 Claims, 12 Drawing Sheets

METHOD AND SYSTEM FOR EVALUATING STRENGTH OF VOLTAGE SOURCE CONVERTER (VSC)-PENETRATED POWER GRID BASED ON VOLTAGE STIFFNESS

CROSS-REFERENCE TO RELATED APPLICATIONS

This application is a continuation of International Patent Application No. PCT/CN2024/109279, filed on Aug. 1, 2024. The content of the aforementioned application, including any intervening amendments made thereto, is incorporated herein by reference in its entirety.

TECHNICAL FIELD

This application relates to power system evaluation, and more particularly to a method and system for evaluating strength of a voltage source converter (VSC)-penetrated power grid based on voltage stiffness.

BACKGROUND

Regarding the traditional power systems dominated by synchronous generators, the voltage strength is commonly represented by the short-circuit ratio. The short-circuit ratio is defined as the ratio of the three-phase short-circuit capacity to the device capacity. The synchronous generator can provide a short-circuit current dozens of times the operating current under the three-phase metallic short circuit. However, due to current limit, the short-circuit current that that the voltage source converter (VSC) can provide is almost the same as its operating current. Since the VSC can maintain the terminal voltage constant, the limited short-circuit current will seriously underestimate the contribution of the VSC, making it difficult for the short-circuit ratio to evaluate the voltage support effect of VSCs accurately. As the proportion of renewable energy increases, the number of VSCs has increased significantly. How to evaluate the voltage strength of VSC-penetrated power systems has become an urgent problem to be solved.

In view of this, extensive attempts have been made in recent years, and various evaluation methods, such as weighted short-circuit ratio, composite short-circuit ratio and generalized short-circuit ratio have been derived. The US Power Reliability Board and General Electric Company have respectively proposed weighted short-circuit ratio and composite short-circuit ratio to analyze the system stability in wind turbine gathering areas. However, the above indicators still require the utilization of the short-circuit current, and fail to take the VSC into full consideration. Based on the singular-induced bifurcation theory, the generalized short-circuit ratio is also proposed. On this basis, a lot of in-depth researches have been carried out. However, due to the complex derivation process, the practicality of the generalized short-circuit ratio is limited. The applicability of the short-circuit ratio gradually decreases with the increase of the penetration rate of VSCs.

Therefore, there is an urgent need to design and develop a method and system for evaluating strength of a VSC-penetrated power grid based on voltage stiffness to address the foregoing technical problems and defects.

SUMMARY

An object of the disclosure is to provide a method and system for evaluating strength of a voltage source converter (VSC)-penetrated power grid based on voltage stiffness, in which the definition and calculation method of voltage stiffness have been proposed for evaluating the voltage strength of VSC-penetrated power systems, so as to overcome the defects in the prior art. In addition, the voltage stiffness fully takes characteristic differences between VSCs and synchronous generators, thereby overcoming the disadvantage that the traditional short-circuit ratio is difficult to characterize the voltage support effect of the VSCs. Moreover, the voltage stiffness calculation is easy to implement and more suitable for practical engineering.

In order to achieve the above object, the following technical solutions are adopted.

In a first aspect, this application provides a method for evaluating strength of a voltage source converter (VSC)-penetrated power grid based on voltage stiffness, comprising:

step (1) acquiring a first data corresponding to a to-be-analyzed power gird in real time, and processing the first data to generate a first admittance matrix corresponding to the to-be-analyzed power grid; wherein the first data is basic planning data of the to-be-analyzed power grid, the first admittance matrix is an original node admittance matrix, the to-be-analyzed power grid comprises a plurality of VSCs respectively corresponding to a plurality of VSC nodes, and the plurality of VSCs comprises a grid-forming VSC and a rated alternating-current (AC) bus voltage grid-following VSC;

step (2) processing the first admittance matrix to generate device impedance data of each of the plurality of VSCs in the to-be-analyzed power grid and a second admittance matrix corresponding to the to-be-analyzed power grid; wherein the second admittance matrix is a corrected node admittance matrix;

step (3) removing rows and columns where a grid-forming VSC node and a rated AC bus voltage grid-following VSC node are located from the second admittance matrix to generate a third admittance matrix;

step (4) processing the third admittance matrix to generate a second data and a third data corresponding to each of the plurality of VSC nodes; wherein the second data is a Thevenin equivalent impedance data of an external system of each of the plurality of VSC nodes, and the third data is voltage stiffness data of each of the plurality of VSC nodes; and step (5) generating strength evaluation data corresponding to the to-be-analyzed power grid based on the third data in combination with the second data.

In some embodiments, the step (1) further comprises:

acquiring network data for formulating the original node admittance matrix corresponding to the to-be-analyzed power grid;

acquiring location data, rated capacity data and sub-transient reactance data of each synchronous generator corresponding to the to-be-analyzed power grid;

acquiring location data, rated capacity data and control mode data of each of the plurality of VSCs in the to-be-analyzed power grid; and acquiring initial bus voltage magnitude data and apparent power data of each line-commutated converter (LCC) corresponding to the to-be-analyzed power grid.

In some embodiments, the step (2) further comprises:

generating the device impedance data of each of the plurality of VSCs in the to-be-analyzed power gird by calculation through equation (1):

$$Z_{device} = \frac{U_{sys}^2}{\overline{S}_{device}^*}; \tag{1}$$

wherein in the equation (1), $\overline{Z}_{device}$ represents a device impedance of each of the plurality of VSCs, $U_{sys}$ represents a voltage magnitude after each of the plurality of VSCs is connected, and $\overline{S}^*_{device}$ represents a conjugate of an apparent power of each of the plurality of VSCs.

In some embodiments, the step (2) further comprises:
combined with a LCC, a load and sub-transient reactance data of each synchronous generator, generating the second admittance matrix corresponding to the to-be-analyzed power grid by calculation through equation (2):

$$Y_{exp} = Y_{org} + Y_{aux}; \tag{2}$$

wherein in the equation (2), $Y_{org}$ denotes the original node admittance matrix for power flow calculation, $Y_{exp}$ denotes the corrected node admittance matrix, and $Y_{aux}$ denotes a correction matrix; and
the correction matrix is expressed as:

$$Y_{aux} = \text{diag}\left(0, \ldots \frac{1}{j\overline{Z}_{LCC}} \ldots, \frac{1}{j\overline{Z}_{load}}, \ldots, \frac{1}{jX_d''}, \ldots 0\right); \tag{3}$$

wherein in equation (3), diag(·) represents a transformation of a vector to a diagonal matrix; and in $Y_{aux}$, only a diagonal element corresponding to a node where the LCC is connected, a diagonal element corresponding to a node where the load is connected, and a diagonal element corresponding to a node where the synchronous generator is connected are non-zero, and the rest are all zero.

In some embodiments, the step (3) further comprises:
acquiring data of the grid-forming VSC node and data of the rated AC bus voltage grid-following VSC node.

In some embodiments, the third admittance matrix corresponding to the to-be-analyzed power grid is generated by calculation through equation (4):

$$Y_{final} = L_{delete}(Y_{exp}, k); \tag{4}$$

wherein in the equation (4), $Y_{final}$ denotes a final node admittance matrix, $Y_{exp}$ denotes the corrected node admittance matrix, k denotes a node number of the grid-forming VSC and the rated AC bus voltage VSC, and $L_{delete}$ represents a function to delete a k-th row and a k-th column from $Y_{exp}$.

In some embodiments, the step (4) further comprises:
generating the Thevenin equivalent impedance data of the external system by calculation through equation (5):

$$\overline{Z}_{th} = Y_{final}^{-1}(h, h); \tag{5}$$

wherein in the equation (5), $Y_{final}$ denotes a final node admittance matrix, and $\overline{Z}_{th}$ represents a Thevenin equivalent impedance of the external system, and is a h-th diagonal element in an inverse matrix of $Y_{final}$;
generating the voltage stiffness data of each of the plurality of VSC nodes by calculation through equation (6):

$$K_{vtg} = \left|\frac{\overline{Z}_{device}}{\overline{Z}_{th} + \overline{Z}_{device}}\right|; \tag{6}$$

wherein in the equation (6), $K_{vtg}$ denotes a voltage stiffness of each of the plurality of VSC nodes, $\overline{Z}_{device}$ is a device impedance of each of the plurality of VSC nodes, and $\overline{Z}_{th}$ is the Thevenin equivalent impedance of the external system.

In some embodiments, the step (5) further comprises:
determining, in real time, whether the external system corresponding to the to-be-analyzed power grid is a strong system based on the strength evaluation data; wherein if the voltage stiffness data is greater than 0.95, the external system is regarded as the strong system.

In a second aspect, this application provides a system for implementing the above method, comprising:
a first data generation unit;
a second data generation unit;
a third data generation unit;
a fourth data generation unit; and
a fifth data generation unit;
wherein the first data generation unit is configured to acquire the first data corresponding to the to-be-analyzed power grid in real time, and process the first data to generate the first admittance matrix corresponding to the to-be-analyzed power grid; wherein the first data is the basic planning data of the to-be-analyzed power grid, the first admittance matrix is the original node admittance matrix, the to-be-analyzed power grid comprises a plurality of VSCs respectively corresponding to a plurality of VSC nodes, and the plurality of VSCs comprises a grid-forming VSC and a rated alternating-current (AC) bus voltage grid-following VSC;
the second data generation unit is configured to process the first admittance matrix to generate the device impedance data of each of the plurality of VSCs in the to-be-analyzed power grid and the second admittance matrix corresponding to the to-be-analyzed power grid; wherein the second admittance matrix is the corrected node admittance matrix;
the third data generation unit is configured to remove the rows and the columns where the grid-forming VSC node and the rated AC bus voltage grid-following VSC node are located from the second admittance matrix to generate the third admittance matrix;
the fourth data generation unit is configured to process the third admittance matrix to generate the second data and the third data corresponding to each of the plurality of VSC nodes; wherein the second data is the Thevenin equivalent impedance data of the external system of each of the plurality of VSC nodes, and the third data is the voltage stiffness data of each of the plurality of VSC nodes; and
the fifth data generation unit is configured to generate the strength evaluation data corresponding to the to-be-analyzed power grid based on the third data in combination with the second data.

In some embodiments, the first data generation unit comprises a first data acquisition module, a second data acquisition module, a third data acquisition module and a fourth data acquisition module; the first data acquisition module is configured to acquire network data for formulating the original node admittance matrix corresponding to the to-be-analyzed power grid; the second data acquisition module is configured to acquire location data, rated capacity data and sub-transient reactance data of each synchronous generator corresponding to the to-be-analyzed power grid; the third data acquisition module is configured to acquire location data, rated capacity data and control mode data of each of the plurality of VSCs in the to-be-analyzed power grid; and the fourth data acquisition module is configured to acquire initial bus voltage magnitude data and apparent power data of each LCC corresponding to the to-be-analyzed power gird.

In some embodiments, the second data generation unit comprises a calculation module, and the calculation module is configured to generate the device impedance data of each of the plurality of VSCs in the to-be-analyzed power grid by calculation through equation (1):

$$\overline{Z}_{device} = \frac{U_{sys}^2}{\overline{S}_{device}^*}; \tag{1}$$

wherein in the equation (1), $\overline{Z}_{device}$ represents a device impedance of each of the plurality of VSCs, $U_{sys}$ represents a voltage magnitude after each of the plurality of VSCs is connected, and $\overline{S}^*_{device}$ represents a conjugate of an apparent power of each of the plurality of VSCs.

In some embodiments, the second data generation unit comprises a calculation module, and the calculation module is configured, in combination with a LCC, a load and sub-transient reactance data of each synchronous generator, to generate the second admittance matrix corresponding to the to-be-analyzed power grid by calculation through equation (2):

$$Y_{exp} = Y_{org} + Y_{aux}; \tag{2}$$

wherein in the equation (2), $Y_{org}$ denotes the original node admittance matrix for power flow calculation, $Y_{exp}$ denotes the corrected node admittance matrix, and $Y_{aux}$ denotes a correction matrix, expressed as:

$$Y_{aux} = \text{diag}\left(0, \ldots \frac{1}{jZ_{LCC}} \ldots, \frac{1}{jZ_{load}}, \ldots, \frac{1}{jX_d''}, \ldots 0\right); \tag{3}$$

wherein in equation (3), diag(·) represents a transformation of a vector to a diagonal matrix; and in $Y_{aux}$, only a diagonal element corresponding to a node where the LCC is connected, a diagonal element corresponding to a node where the load is connected, and a diagonal element corresponding to a node where the synchronous generator is connected are non-zero, and the rest are all zero.

In some embodiments, the third data generation unit comprises a data acquisition module and a processing module; the data acquisition module is configured to acquire data of the grid-forming VSC node and data of the rated AC bus voltage grid-following VSC node; and the processing module is configured to remove the rows and the columns in the second admittance matrix to generate the third admittance matrix in real time.

In some embodiments, the third data generation unit comprises a calculation module, and the calculation module is configured to generate the third admittance matrix corresponding to the to-be-analyzed power grid by calculation through equation (4):

$$Y_{final} = L_{delete}(Y_{exp}, k); \tag{4}$$

wherein in the equation (4), $Y_{final}$ denotes a final node admittance matrix, $Y_{exp}$ denotes the corrected node admittance matrix, k denotes a node number of the grid-forming VSC and the rated AC bus voltage VSC, and $L_{delete}$ represents a function to delete a k-th row and a k-th column from $Y_{exp}$.

In some embodiments, the fourth data generation unit comprises a first calculation module and a second calculation module; the first calculation module is configured to generate the Thevenin equivalent impedance data of the external system by calculation through equation (5):

$$\overline{Z}_{th} = Y_{final}^{-1}(h, h); \tag{5}$$

wherein in the equation (5), $Y_{final}$ denotes a final node admittance matrix, and $\overline{Z}_{th}$ represents a Thevenin equivalent impedance of the external system, and is a h-th diagonal element in an inverse matrix of $Y_{final}$; and the second calculation module is configured to generate the voltage stiffness data of each of the plurality of VSC nodes by calculation through equation (6):

$$K_{vtg} = \left|\frac{\overline{Z}_{device}}{\overline{Z}_{th} + \overline{Z}_{device}}\right|; \tag{6}$$

wherein in the equation (6), $K_{vtg}$ denotes a voltage stiffness of each of the plurality of VSC nodes, $\overline{Z}_{device}$ is a device impedance of each of the plurality of VSC nodes, and $\overline{Z}_{th}$ is the Thevenin equivalent impedance of the external system.

In some embodiments, the fifth data generation unit comprises a determination module, and the determination module is configured to determine, in real time, whether the external system corresponding to the to-be-analyzed power grid is a strong system based on the strength evaluation data.

Compared with the prior art, this application has the following beneficial effects.

In the present disclosure, the first data corresponding to the to-be-analyzed power grid is acquired in real time, and is processed to generate the first admittance matrix corresponding to the to-be-analyzed power grid, where the first data is the basic planning data of the to-be-analyzed power grid, the first admittance matrix is the original node admittance matrix, the to-be-analyzed power grid comprises the plurality of VSCs respectively corresponding to the plurality of VSC nodes, and the plurality of VSCs comprises the grid-forming VSC and the rated AC bus voltage grid-following VSC; the first admittance matrix is processed to generate the device impedance data of each of the plurality of VSCs in the to-be-analyzed power grid and the second admittance matrix corresponding to the to-be-analyzed power grid, where the second admittance matrix is the corrected node admittance matrix; the rows and the columns where the grid-forming VSC node and the rated AC bus voltage grid-following VSC node are located are removed from the second admittance matrix to generate the third admittance matrix; the third admittance matrix is processed to generate the second data and the third data corresponding to each of the plurality of VSC nodes, where the second data is the Thevenin equivalent impedance data of the external system of each of the plurality of VSC nodes, and the third data is the voltage stiffness data of each of the plurality of VSC nodes; and the strength evaluation data corresponding to the to-be-analyzed power grid is generated based on the third data in combination with the second data. The definition and calculation method of voltage stiffness have been proposed for evaluating the voltage strength of VSC-penetrated power systems, so as to overcome the defects in the prior art. In addition, the voltage stiffness fully takes characteristic differences between VSCs and synchronous generators, thereby overcoming the disadvantage that the traditional short-circuit ratio is difficult to characterize the voltage support effect of the VSCs. Moreover, the voltage stiffness calculation is easy to implement and more suitable for practical engineering.

BRIEF DESCRIPTION OF THE DRAWINGS

In order to make the technical solutions of the embodiments of the present disclosure or the technical solutions in the prior art clearer, the accompanying drawings required in the description of the embodiments or prior art will be briefly described below. Obviously, presented in the drawings are merely some embodiments of the disclosure. For those of ordinary skill in the art, other drawings can be obtained based on the drawings of the disclosure without making creative efforts.

FIG. 4a shows active power of a line-commutated converter (LCC) after changing the series impedance, FIG. 4b shows alternating current (AC) voltage of the LCC after changing the series impedance, FIG. 4c shows direct current (DC) voltage of the LCC after changing the series impedance, and FIG. 4d shows DC current of the LCC after changing the series impedance;

Figure 1:
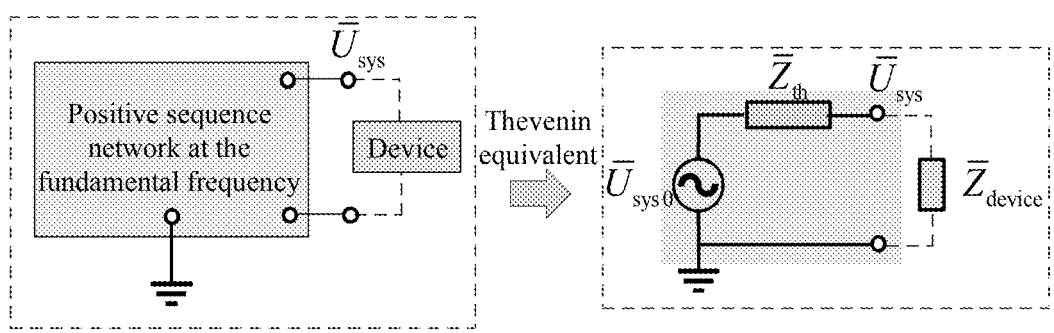
FIG. 1 is a schematic diagram of a Thevenin equivalent principle of any device in a power grid of a method for evaluating strength of a voltage source converter (VSC)-penetrated power grid based on voltage stiffness in accordance with an embodiment of the present disclosure.

The purpose, functional features and advantages of the present disclosure will be further explained in conjunction with the embodiments and the accompanying drawings.

DETAILED DESCRIPTION OF EMBODIMENTS

In order to make the purpose, technical solutions and advantages of the present disclosure clearer, the present disclosure will be further described in detail below in conjunction with the accompanying drawings and the embodiments. Other advantages and effects of the present disclosure can be easily understood by those skilled in the art based on the contents disclosed in this application.

The present disclosure can be implemented or applied through other different specific examples, and the details in this specification can also be modified and changed in various ways based on different viewpoints and applications without departing from the spirit of the present disclosure.

It should be noted that all directional indications (such as up, down, left, right, front and back) in the description of the embodiments are merely intended to explain a relative positional relationship, movement, etc. between components in a specific posture (as shown in the accompanying drawings). When the specific posture changes, the directional indication changes accordingly.

In addition, descriptions involving "first", "second", etc. in this application are only descriptive, and cannot be understood as indicating or implying relative importance or implicitly indicating the number of indicated technical features. Therefore, features defined as "first" and "second" can explicitly or implicitly include at least one of the features. Moreover, technical solutions in the embodiments can be combined with each other, but must be based on what can be achieved by those of ordinary skill in the art. When the combination of technical solutions appears to be contradictory or cannot be realized, it should be deemed that such combination of technical solutions does not exist and is not within the scope of the present disclosure defined by the appended claims.

The present disclosure will be further described in detail below in conjunction with the accompanying drawings. As shown in FIGS. 1-3, 4a-d, 5a-b and 6-7, a method for evaluating strength of a voltage source converter (VSC)-penetrated power grid based on voltage stiffness is provided, including the following steps.

(S1) A first data corresponding to a to-be-analyzed power grid is acquired in real time. The first data is processed to generate a first admittance matrix corresponding to the to-be-analyzed power grid. The first data is basic planning data of the to-be-analyzed power grid, the first admittance matrix is an original node admittance matrix, the to-be-analyzed power grid includes a plurality of VSCs respectively corresponding to a plurality of VSC nodes, and the plurality of VSCs includes a grid-forming VSC and a rated alternating-current (AC) bus voltage grid-following VSC.

(S2) The first admittance matrix is processed to generate device impedance data of each of the plurality of VSCs in the to-be-analyzed power grid and a second admittance matrix corresponding to the to-be-analyzed power grid. The second admittance matrix is a corrected node admittance matrix.

(S3) Rows and columns where a grid-forming VSC node and a rated AC bus voltage grid-following VSC node are located is removed from the second admittance matrix to generate a third admittance matrix.

(S4) The third admittance matrix is processed to generate a second data and a third data corresponding to each of the plurality of VSC nodes. The second data is a Thevenin equivalent impedance data of an external system of each of the plurality of VSC nodes. The third data is voltage stiffness data of each of the plurality of VSC nodes.

(S5) Strength evaluation data corresponding to the to-be-analyzed power grid is generated based on the third data in combination with the second data.

The step (S1) further includes the following steps.

(S11) Network data for formulating the original node admittance matrix corresponding to the to-be-analyzed power grid is acquired.

(S12) Location data, rated capacity data and sub-transient reactance data of each synchronous generator corresponding to the to-be-analyzed power grid are acquired.

(S13) Location data, rated capacity data and control mode data of each of the plurality of VSCs in the to-be-analyzed power grid are acquired.

(S14) Initial bus voltage magnitude data and apparent power data of each line-commutated converter (LCC) corresponding to the to-be-analyzed power grid are acquired.

The step (S2) further includes the following step.

(S21) The device impedance data of each of the plurality of VSCs in the to-be-analyzed power grid is generated by calculation through Equation (1).

$$Z_{device} = \frac{U_{sys}^2}{\overline{S}_{device}^*} \quad (1)$$

In the Equation (1), $\overline{Z}_{device}$ represents a device impedance of each of the plurality of VSCs, $U_{sys}$ represents a voltage magnitude after each of the plurality of VSCs is connected, and $\overline{S}^*_{device}$ represents a conjugate of an apparent power of each of the plurality of VSCs.

The step (S2) further includes the following step.

(S22) Combined with a LCC, a load and sub-transient reactance data of each synchronous generator, the second admittance matrix corresponding to the to-be-analyzed power grid is generated by calculation through Equation (2).

$$Y_{exp} = Y_{org} + Y_{aux} \quad (2)$$

In the Equation (2), $Y_{org}$ denotes the original node admittance matrix for power flow calculation, $Y_{exp}$ denotes the corrected node admittance matrix, and $Y_{aux}$ denotes a correction matrix.

The correction matrix is expressed as follows.

$$Y_{aux} = \text{diag}\left(0, \ldots \frac{1}{j\overline{Z}_{LCC}} \ldots, \frac{1}{j\overline{Z}_{load}}, \ldots, \frac{1}{jX_d''}, \ldots 0\right) \quad (3)$$

In Equation (3), diag(·) represents a transformation of a vector to a diagonal matrix. In $Y_{aux}$, only a diagonal element corresponding to a node where the LCC is connected, a diagonal element corresponding to a node where the load is connected, and a diagonal element corresponding to a node where the synchronous generator is connected are non-zero, and the rest are all zero.

The step (S3) further includes the following steps.

(S31) Data of the grid-forming VSC node and data of the rated AC bus voltage grid-following VSC node are acquired.

(S32) The rows and the columns in the second admittance matrix are removed to generate the third admittance matrix in real time.

The step (S3) further includes the following step.

The third admittance matrix corresponding to the to-be-analyzed power grid is generated by calculation through Equation (4).

$$Y_{final} = L_{delete}(Y_{exp}, k); \quad (4)$$

In the Equation (4), $Y_{final}$ denotes a final node admittance matrix, $Y_{exp}$ denotes the corrected node admittance matrix, k denotes a node number of the grid-forming VSC and the rated AC bus voltage VSC, and $L_{delete}$ represents a function to delete a k-th row and a k-th column from $Y_{exp}$.

The step (4) further includes the following steps.

(S41) The Thevenin equivalent impedance data of the external system is generated by calculation through Equation (5).

$$\overline{Z}_{th} = Y_{final}^{-1}(h, h) \quad (5)$$

In the Equation (5), $Y_{final}$ denotes a final node admittance matrix, and $\overline{Z}_{th}$ represents a Thevenin equivalent impedance of the external system, and is a h-th diagonal element in an inverse matrix of $Y_{final}$.

(S42) The voltage stiffness data of each of the plurality of VSC nodes is generated by calculation through Equation (6).

$$K_{vtg} = \left|\frac{\overline{Z}_{device}}{\overline{Z}_{th} + \overline{Z}_{device}}\right| \quad (6)$$

In the Equation (6), $K_{vtg}$ denotes a voltage stiffness of each of the plurality of VSC nodes, $\overline{Z}_{device}$ is a device impedance of each of the plurality of VSC nodes, and $\overline{Z}_{th}$ is the Thevenin equivalent impedance of the external system.

The step (S5) further includes the following step.

Whether the external system corresponding to the to-be-analyzed power grid is a strong system is determined in real time based on the strength evaluation data. If the voltage stiffness data $K_{vtg}$ is greater than 0.95, the external system is regarded as the strong system.

Specifically, in an embodiment of the present disclosure, a method for evaluating strength of a VSC-penetrated power grid based on voltage stiffness is provided, including the following steps. (1) The basic planning data of the to-be-analyzed power grid is acquired, and the original node admittance matrix $Y_{org}$ is calculated. (2) The device impedance of each VSC in the to-be-analyzed power grid is calculated. (3) The corrected node admittance matrix $Y_{exp}$ of the to-be-analyzed power grid is calculated. (4) The row and the column where a specific VSC node is located are removed from $Y_{exp}$ to obtain the final node admittance matrix $Y_{final}$. (5) The Thevenin equivalent impedance of the external system of each VSC node is calculated using the final node admittance matrix $Y_{final}$. (6) The voltage stiffness of each VSC node is calculated, and the grid strength is evaluated.

The basic planning data in step (1) mainly includes four parts: 1) the network data for formulating the original node admittance matrix; 2) the location, rated capacity and sub-transient reactance of each synchronous generator in the to-be-analyzed power grid; 3) the location, rated capacity and control mode of each VSC; and 4) the initial bus voltage magnitude and apparent power of each LCC.

The device impedance of each of the plurality of VSCs in step (2) can be calculated by the Equation (1).

$$\bar{Z}_{device} = \frac{U_{sys}^2}{\bar{S}_{device}^*} \tag{1}$$

In the Equation (1), $\bar{Z}_{device}$ represents the device impedance of each of the plurality of VSCs, $U_{sys}$ represents the voltage magnitude after each of the plurality of VSCs is connected, and $\bar{S}^*_{device}$ represents the conjugate of the apparent power of each of the plurality of VSCs.

In step (3), the node admittance matrix is corrected by the Equation (2), so as to incorporate the LCC, the load and the sub-transient reactance of the synchronous generator.

$$Y_{exp} = Y_{org} + Y_{aux} \tag{2}$$

In the Equation (2), $Y_{org}$ denotes the original node admittance matrix for power flow calculation, $Y_{exp}$ denotes the corrected node admittance matrix, and $Y_{aux}$ denotes the correction matrix expressed as the Equation (3).

$$Y_{aux} = \text{diag}\left(0, \ldots \frac{1}{j\bar{Z}_{LCC}} \ldots, \frac{1}{j\bar{Z}_{load}}, \ldots, \frac{1}{jX_d''}, \ldots 0\right) \tag{3}$$

In the Equation (3), diag(·) represents the transformation of the vector to the diagonal matrix. In $Y_{aux}$, only the diagonal element corresponding to the node where the LCC is connected, a diagonal element corresponding to a node where the load is connected, and the diagonal element corresponding to a node where the synchronous generator is connected are non-zero, and the rest are all zero.

In step (4), the specific VSC nodes are a grid-forming VSC node and a rated AC bus voltage grid-following VSC node. The final node admittance matrix $Y_{final}$ is obtained by removing the rows and the columns where the specific VSC nodes are located from $Y_{exp}$, expressed as the Equation (4).

$$Y_{final} = L_{delete}(Y_{exp}, k); \tag{4}$$

In the Equation (4), $Y_{final}$ denotes the final node admittance matrix, k denotes the node number of the grid-forming VSC and the rated AC bus voltage VSC, and $L_{delete}$ represents the function to delete the k-th row and the k-th column from $Y_{exp}$.

In step (5), the Thevenin equivalent impedance of the external system of the h-th VSC node is calculated by the Equation (5).

$$\bar{Z}_{th} = Y_{final}^{-1}(h, h) \tag{5}$$

This means that the Thevenin equivalent impedance $\bar{Z}_{th}$ of the external system is the h-th diagonal element in the inverse matrix of $Y_{final}$.

In step (6), the voltage stiffness of each of the plurality of VSC nodes is calculated by the Equation (6).

$$K_{vtg} = \left|\frac{\bar{Z}_{device}}{\bar{Z}_{th} + \bar{Z}_{device}}\right| \tag{6}$$

In the Equation (6), $K_{vtg}$ denotes the voltage stiffness of each of the plurality of VSC nodes, $\bar{Z}_{device}$ is the device impedance of each of the plurality of VSC nodes, and $\bar{Z}_{th}$ is the Thevenin equivalent impedance of the external system. When the calculated voltage stiffness $K_{vtg}$ is greater than 0.95, the external system is regarded as a strong system.

In other words, the voltage strength is described by the ability to maintain the voltage magnitude close to the no-load voltage after a device is connected, which is named voltage stiffness, expressed as Equation (11).

$$K_{vtg} = \frac{U_{sys}}{U_{sys0}} \tag{11}$$

In the Equation (11), $K_{vtg}$ is the voltage stiffness, $U_{sys}$ is a voltage magnitude after a component is connected, and $U_{sys0}$ is a no-load voltage magnitude.

A value range of $K_{vtg}$ is [0, 1]. If $K_{vtg}$ is close to or even equal to 1, a connection status of the device has little impact on the voltage magnitude, indicating that the voltage strength is very strong. On the contrary, if $K_{vtg}$ is far away from 1, the device connection will significantly reduce the voltage magnitude. Next, the Thevenin equivalent circuit is utilized to introduce the voltage stiffness from the perspective of impedance. When investigating the voltage strength, the object of investigation is the positive sequence network at the fundamental frequency. According to the Thevenin equivalent principle, the external system at any point can be presented by a Thevenin equivalent circuit, as shown in FIG. 1.

In FIG. 1, $\bar{U}_{sys}$ is a voltage phasor of the device, $\bar{Z}_{th}$ is a phasor of the Thevenin equivalent impedance, $\bar{U}_{sys0}$ is a phasor of the equivalent electromotive force. The $\bar{U}_{sys}$ can be expressed as Equation (12).

$$\bar{U}_{sys} = \frac{\bar{Z}_{device}}{\bar{Z}_{th} + \bar{Z}_{device}} \bar{U}_{sys0} \tag{12}$$

From the perspective of impedance, the voltage stiffness can be expressed as Equation (13). According to the Equation (13), only the Thevenin equivalent impedance of the system and the device impedance are required to obtain the voltage stiffness.

$$K_{vtg} = \left|\frac{\bar{U}_{sys}}{\bar{U}_{sys0}}\right| = \left|\frac{\bar{Z}_{device}}{\bar{Z}_{th} + \bar{Z}_{device}}\right| \tag{13}$$

Figure 2:
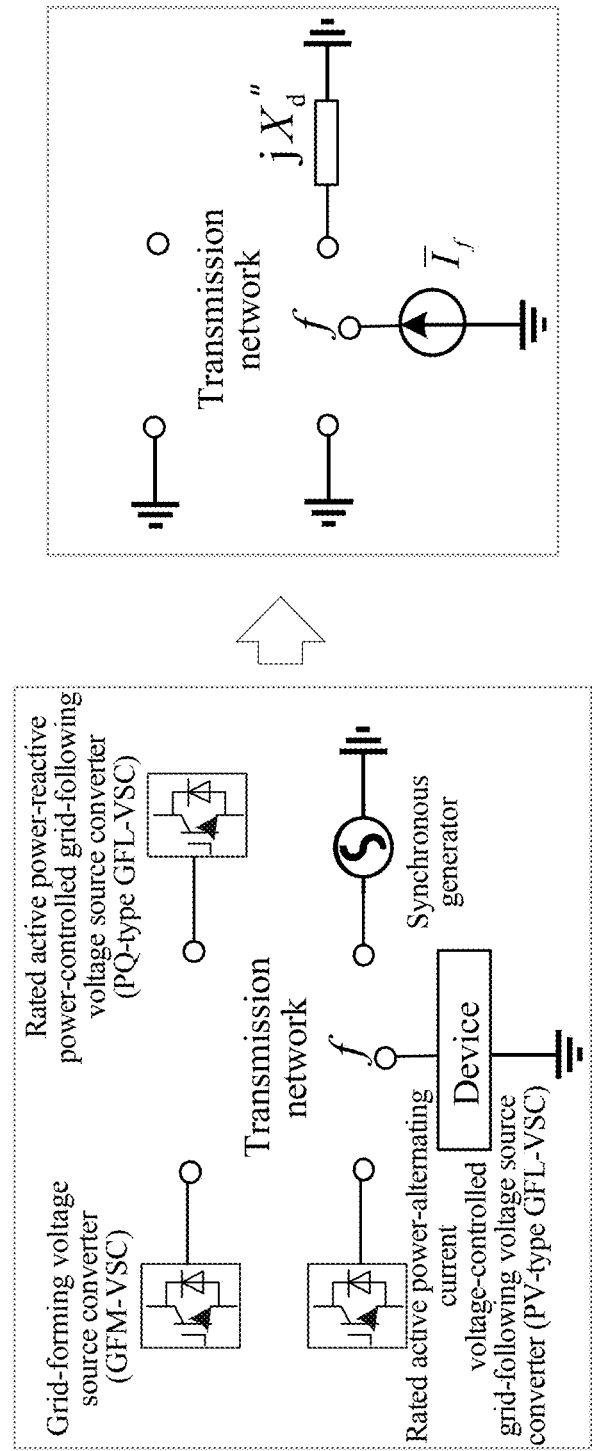
FIG. 2 is a schematic diagram of a calculation principle of a Thevenin equivalent impedance of the method in accordance with an embodiment of the present disclosure.

A calculation principle of the Thevenin equivalent impedance is presented in FIG. 2. Each independent power source in the system is set to zero, then the equivalent impedance of the fundamental frequency positive sequence network viewed from the device is the expected Thevenin equivalent impedance. Normally, a grid-forming-controlled VSC (GFM-VSC) and a rated active power-alternating current voltage-controlled grid-following VSC (PV-type GFL-VSC) exhibit the external variable voltage source, and a rated active power-reactive power-controlled grid-following VSC (PQ-type GFL-VSC) exhibit the external variable current source. Therefore, the GFM-VSC and the PV-type GFL-VSC are regarded as short circuits, while the PQ-type GFL-VSC is regarded as an open circuit. For synchronous generators, a short circuit through the sub-transient reactance is adopted. In addition, loads and LCCs are replaced by constant impedances.

Subsequently, the grid strength is evaluated according to the method proposed by the present disclosure.

(1) The basic planning data of the to-be-analyzed power grid is acquired, and the original node admittance matrix $Y_{org}$ is calculated. (2) The device impedance of each VSC in the to-be-analyzed power grid is calculated. (3) The corrected node admittance matrix $Y_{exp}$ of the to-be-analyzed power grid is calculated. (4) The row and the column where a specific VSC node is located are removed from $Y_{exp}$ to obtain the final node admittance matrix $Y_{final}$. (5) The Thevenin equivalent impedance of the external system of each VSC node is calculated using the final node admittance matrix $Y_{final}$. (6) The voltage stiffness of each VSC node is calculated, and the grid strength is evaluated.

The basic planning data in step (1) mainly includes four parts: 1) the network data for formulating the original node admittance matrix; 2) the location, rated capacity and sub-transient reactance of each synchronous generator in the to-be-analyzed power grid; 3) the location, rated capacity and control mode of each VSC; and 4) the initial bus voltage magnitude and apparent power of each LCC.

The device impedance of each of the plurality of VSCs in step (2) can be calculated by the Equation (1).

$$\overline{Z}_{device} = \frac{U_{sys}^2}{\overline{S}_{device}^*} \qquad (1)$$

In the Equation (1), $\overline{Z}_{device}$ represents the device impedance of each of the plurality of VSCs, $U_{sys}$ represents the voltage magnitude after each of the plurality of VSCs is connected, and $\overline{S}^*_{device}$ represents the conjugate of the apparent power of each of the plurality of VSCs.

In step (3), the node admittance matrix is corrected by Equation (2), so as to incorporate the LCC, the load and the sub-transient reactance of the synchronous generator.

$$Y_{exp} = Y_{org} + Y_{aux} \qquad (2)$$

In the Equation (2), $Y_{org}$ denotes the original node admittance matrix for power flow calculation, $Y_{exp}$ denotes the corrected node admittance matrix, and $Y_{aux}$ denotes the correction matrix expressed as the Equation (3).

$$Y_{aux} = \mathrm{diag}\left(0, \ldots \frac{1}{j\overline{Z}_{LCC}} \ldots, \frac{1}{j\overline{Z}_{load}}, \ldots, \frac{1}{jX_d''}, \ldots 0\right) \qquad (3)$$

In the Equation (3), diag(·) represents the transformation of the vector to the diagonal matrix. In $Y_{aux}$, only the diagonal element corresponding to the node where the LCC is connected, a diagonal element corresponding to a node where the load is connected, and the diagonal element corresponding to a node where the synchronous generator is connected are non-zero, and the rest are all zero.

In step (4), the specific VSC nodes are a grid-forming VSC node and a rated AC bus voltage grid-following VSC node. The final node admittance matrix $Y_{final}$ is obtained by removing the rows and the columns where the specific VSC nodes are located from $Y_{exp}$, expressed as the Equation (4).

$$Y_{final} = L_{delete}(Y_{exp}, k) \qquad (4)$$

In the Equation (4), $Y_{final}$ denotes the final node admittance matrix, k denotes the node number of the grid-forming VSC and the rated AC bus voltage VSC, and $L_{delete}$ represents the function to delete the k-th row and the k-th column from $Y_{exp}$.

In step (5), the Thevenin equivalent impedance of the external system of the h-th VSC node is calculated by the Equation (5).

$$\overline{Z}_{th} = Y_{final}^{-1}(h, h) \qquad (5)$$

This means that the Thevenin equivalent impedance $\overline{Z}_{th}$ of the external system is the h-th diagonal element in the inverse matrix of $Y_{final}$.

In step (6), the voltage stiffness of each of the plurality of VSC nodes is calculated by the Equation (6).

$$K_{vtg} = \left|\frac{\overline{Z}_{device}}{\overline{Z}_{th} + \overline{Z}_{device}}\right| \qquad (6)$$

In the Equation (6), $K_{vtg}$ denotes the voltage stiffness of each of the plurality of VSC nodes, $\overline{Z}_{device}$ is the device impedance of each of the plurality of VSC nodes, and $\overline{Z}_{th}$ is the Thevenin equivalent impedance of the external system. When the calculated voltage stiffness $K_{vtg}$ is greater than 0.95, the external system is regarded as a strong system.

Embodiment 1

Figure 3:
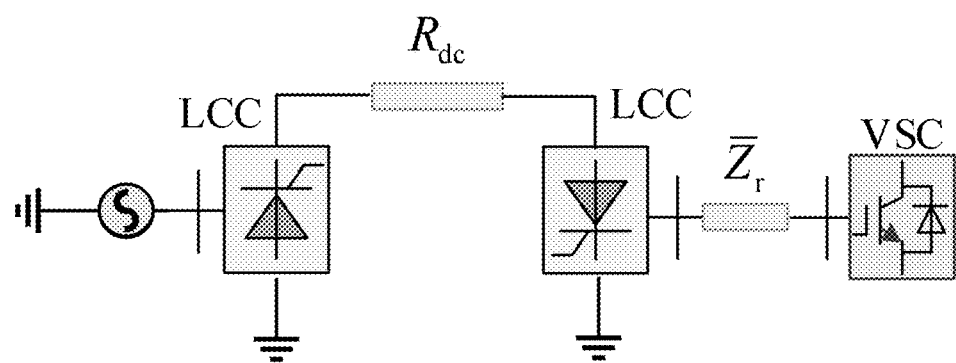
FIG. 3 is a schematic diagram of a simple high-voltage direct current (HVDC) infeed system of the method in accordance with an embodiment of the present disclosure.
Figure 4A:
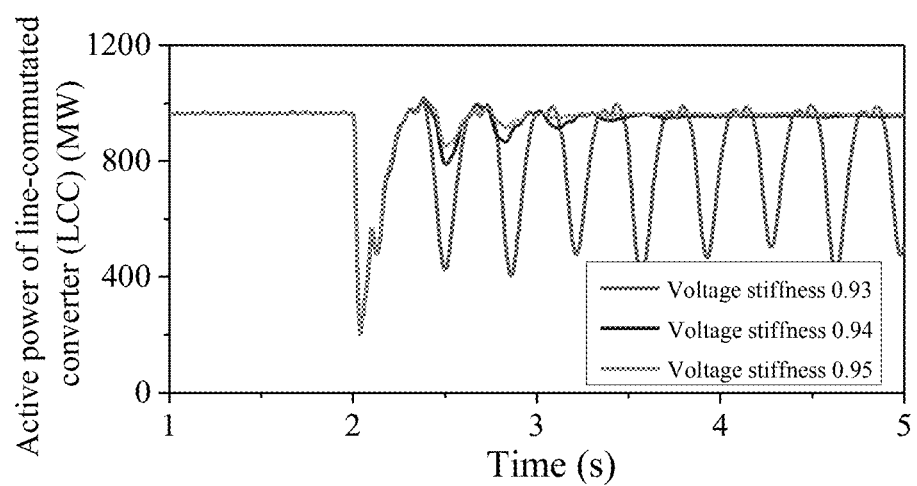
FIGS. 4a-d show simulation results by changing a series impedance in the method in accordance with an embodiment of the present disclosure, where
Figure 4B:
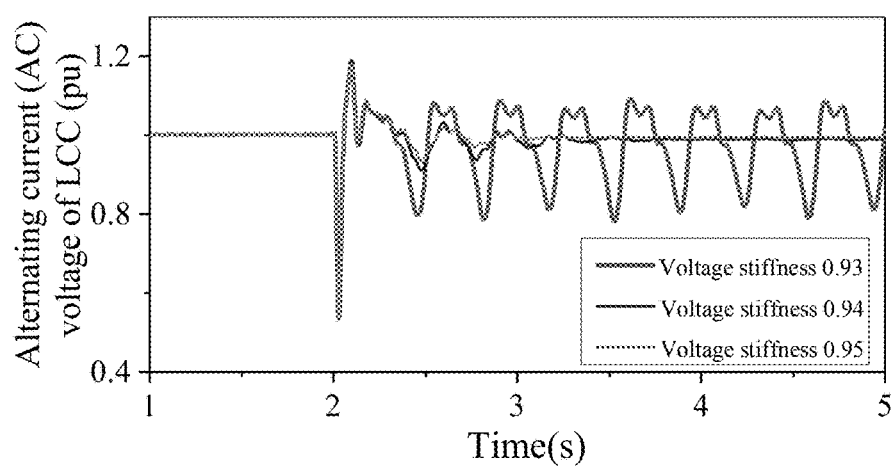
Figure 4C:
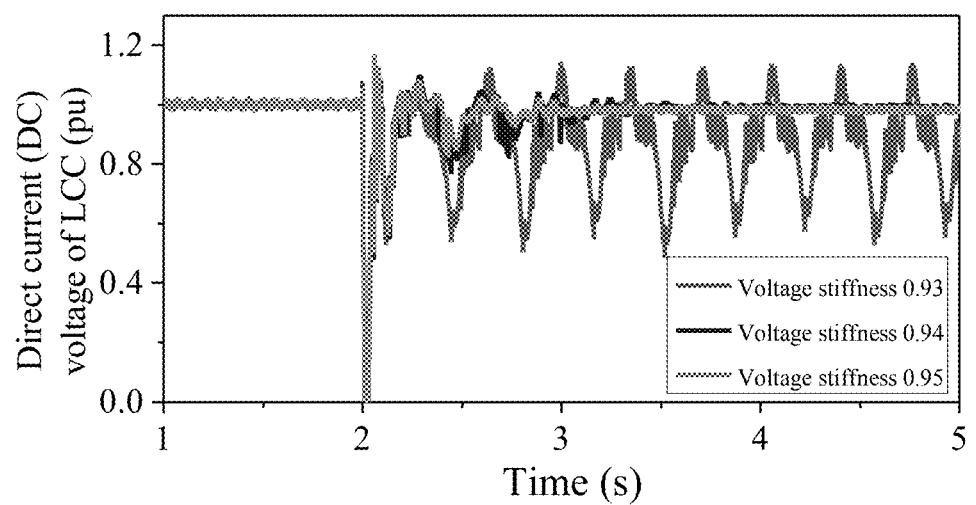
Figure 4D:
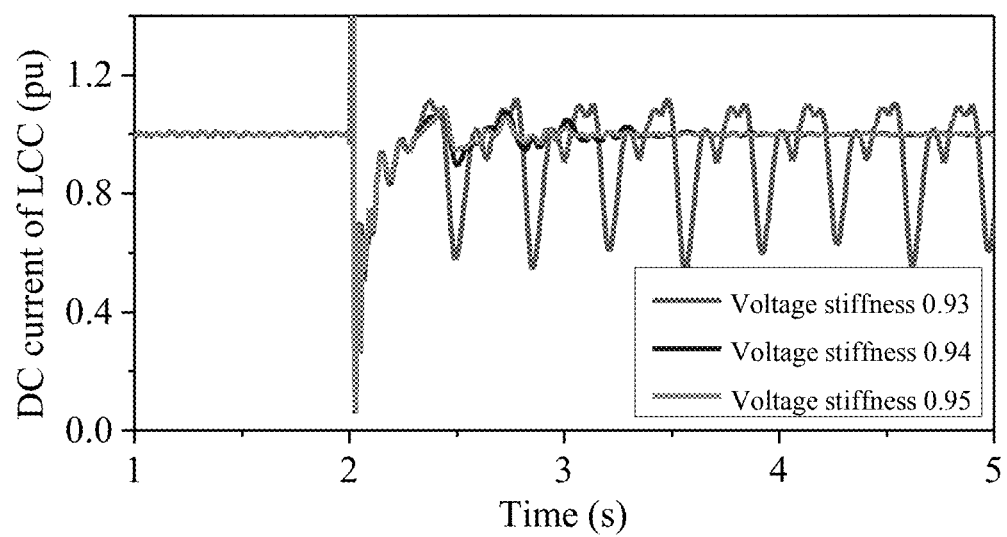

First, a simple high-voltage direct current (HVDC) infeed system is constructed on PSCAD/EMTDC™. The structure of the system is shown in FIG. 3. The system parameters are shown in Table 1.

TABLE 1

Main parameters of the simple HVDC infeed system

| | Items | Value |
| --- | --- | --- |
| LCC | Rated active power | 1000 MW |
| | Rated direct current (DC) voltage | 500 kV |
| | Valve-side AC voltage | 210 kV |
| | Grid-side AC voltage | 345 kV |

TABLE 1-continued

Main parameters of the simple HVDC infeed system

| | Items | Value |
|---|---|---|
| VSC | Rated capacity | 1000 MVA |
| | Rated DC voltage | 400 kV |
| | Control mode | Voltage/frequency (VF) control |

A simulation is performed by changing the series impedance of the system to simulate the stability of the system operation under different voltage stiffness. At 2.0 s, the voltage stiffness changes from 0.99 to 0.93, 0.94 and 0.95, respectively. The simulation results are shown in FIGS. 4a-d. It can be seen from FIGS. 4a-d that the system will be unstable only when the voltage stiffness is less than 0.93.

Figure 5A:
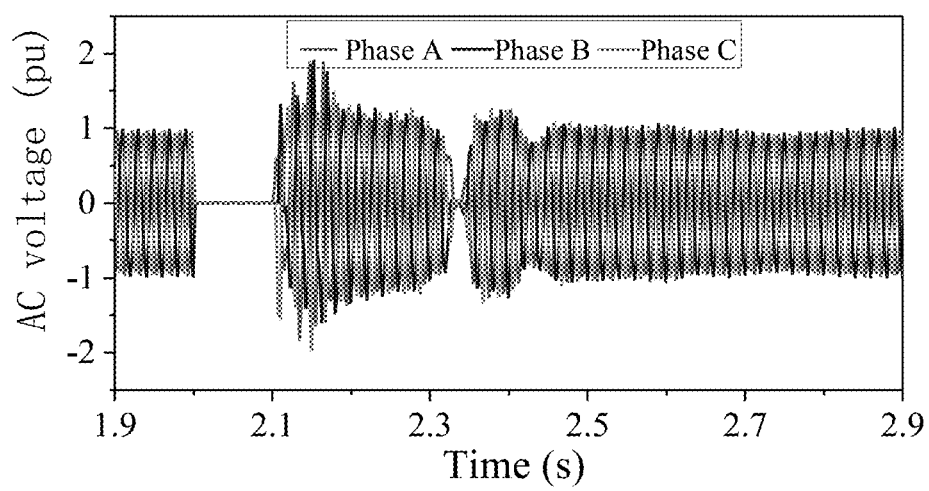
FIGS. 5a-b show simulation waveform of the simple HVDC infeed system under a short-circuit fault in accordance with an embodiment of the present disclosure.
Figure 5B:
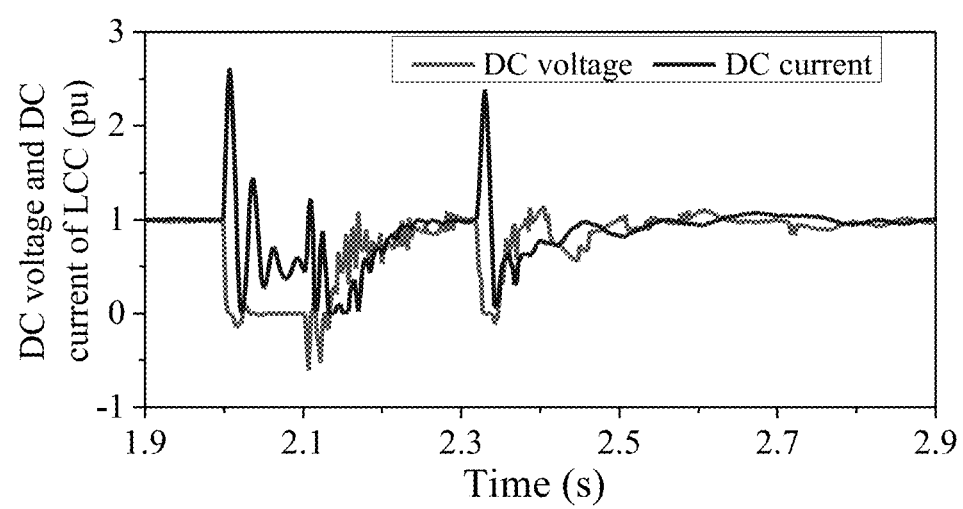

Then, in a case where the voltage stiffness is equal to 0.95, a three-phase metallic short-circuit fault is imposed on the inverter side. The simulation results are shown in FIGS. 5a-b. It can be seen from FIGS. 5a-b that after the fault is eliminated, the system can operate stably.

Embodiment 2

Figure 6:
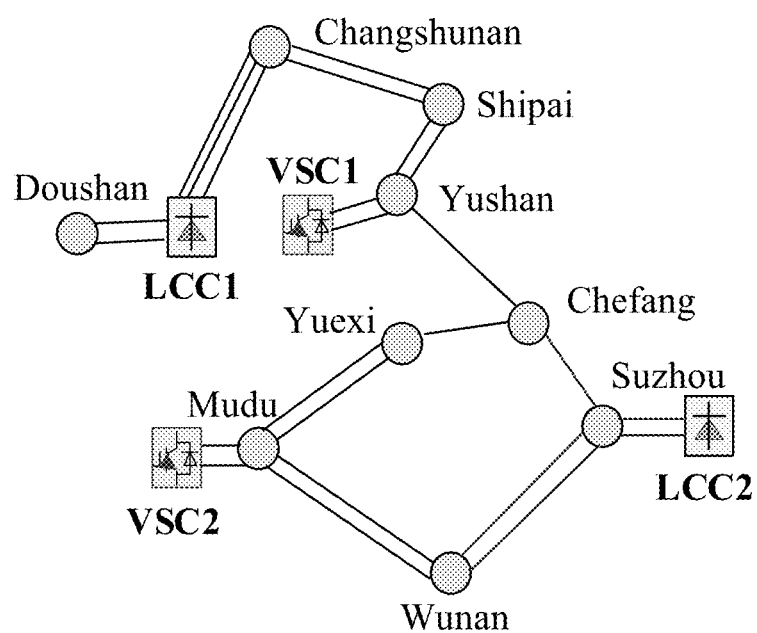
FIG. 6 is a schematic diagram of a portion of a 500 kV provincial power grid structure in China of the method in accordance with an embodiment of the present disclosure.
Figure 7:
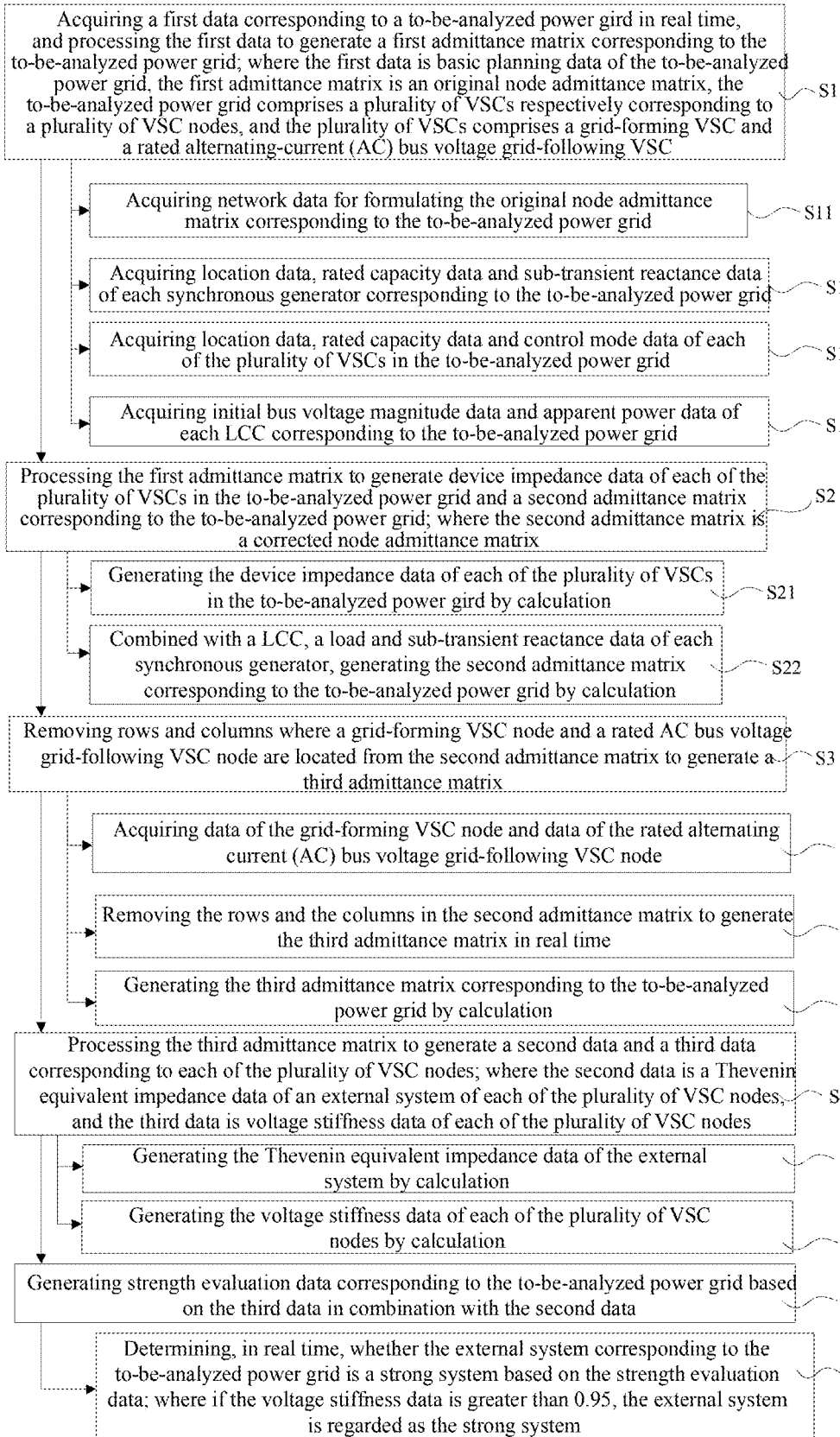
FIG. 7 is a flow chart of the method in accordance with an embodiment of the present disclosure.

Simulations are performed in an actual provincial power grid in China. A partial structure of a 500 kV power grid is shown in FIG. 6. The simulations are performed in two cases, where case 1: two VSCs adopt constant reactive power control mode; and case 2: two VSCs adopt constant AC voltage control mode. The red lines are lengthened to reduce the AC system strength relative to LCC2. An operating point where LCC2 is in a critical voltage unstable state is found. The critical short circuit ratio is 0.907 in case 1 and 0.903 in case 2. No matter in which case, the voltage stiffness of 0.9 as the stability boundary can match the simulation results as expected.

Figure 8:
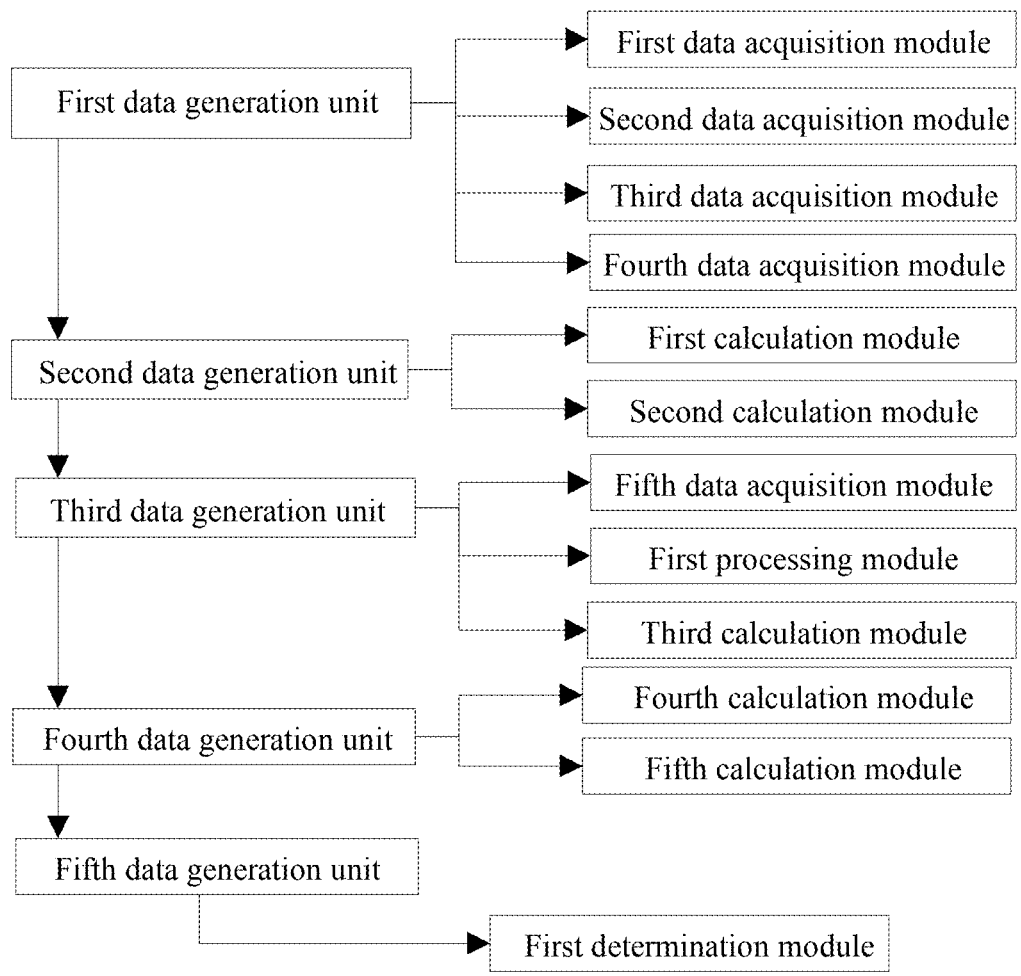
FIG. 8 is a schematic diagram of a system for evaluating strength of a VSC-penetrated power grid based on voltage stiffness in accordance with an embodiment of the present disclosure.

In order to achieve the above object, a system for implementing the above method is also provided. As shown in FIG. 8, the system is configured to be applied to the above method. The system includes a first data generation unit, a second data generation unit, a third data generation unit, a fourth data generation unit and a fifth data generation unit.

The first data generation unit is configured to acquire first data corresponding to the to-be-analyzed power grid in real time, and process the first data to generate the first admittance matrix corresponding to the to-be-analyzed power grid. The first data is the basic planning data of the to-be-analyzed power grid, the first admittance matrix is the original node admittance matrix, the to-be-analyzed power grid includes a plurality of VSCs respectively corresponding to a plurality of VSC nodes, and the plurality of VSCs includes a grid-forming VSC and a rated AC bus voltage grid-following VSC.

The second data generation unit is configured to process the first admittance matrix to generate the device impedance data of each of the plurality of VSCs in the to-be-analyzed power grid and the second admittance matrix corresponding to the to-be-analyzed power grid. The second admittance matrix is the corrected node admittance matrix.

The third data generation unit is configured to remove the rows and the columns where the grid-forming VSC node and the rated AC bus voltage grid-following VSC node are located from the second admittance matrix to generate the third admittance matrix.

The fourth data generation unit is configured to process the third admittance matrix to generate the second data and the third data corresponding to each of the plurality of VSC nodes. The second data is the Thevenin equivalent impedance data of the external system of each of the plurality of VSC nodes, and the third data is the voltage stiffness data of each of the plurality of VSC nodes.

The fifth data generation unit is configured to generate the strength evaluation data corresponding to the to-be-analyzed power grid based on the third data in combination with the second data.

In an embodiment, the first data generation unit includes a first data acquisition module, a second data acquisition module, a third data acquisition module and a fourth data acquisition module.

The first data acquisition module is configured to acquire network data for formulating the original node admittance matrix corresponding to the to-be-analyzed power grid.

The second data acquisition module is configured to acquire location data, rated capacity data and sub-transient reactance data of each synchronous generator corresponding to the to-be-analyzed power grid.

The third data acquisition module is configured to acquire location data, rated capacity data and control mode data of each of the plurality of VSCs in the to-be-analyzed power grid.

The fourth data acquisition module is configured to acquire initial bus voltage magnitude data and apparent power data of each LCC corresponding to the to-be-analyzed power gird.

In an embodiment, the second data generation unit includes a first calculation module. The first calculation module is configured to generate the device impedance data of each of the plurality of VSCs in the to-be-analyzed power grid by calculation through Equation (1).

$$\overline{Z}_{device} = \frac{U_{sys}^2}{\overline{S}_{device}^*} \quad (1)$$

In the Equation (1), $\overline{Z}_{device}$ represents a device impedance of each of the plurality of VSCs, $U_{sys}$ represents a voltage magnitude after each of the plurality of VSCs is connected, and $\overline{S}^*_{device}$ represents a conjugate of an apparent power of each of the plurality of VSCs.

In an embodiment, the second data generation unit includes a second calculation module. The second calculation module is configured, in combination with a LCC, a load and sub-transient reactance data of each synchronous generator, to generate the second admittance matrix corresponding to the to-be-analyzed power grid by calculation through Equation (2).

$$Y_{exp} = Y_{org} + Y_{aux} \quad (2)$$

In the Equation (2), $Y_{org}$ denotes the original node admittance matrix for power flow calculation, $Y_{exp}$ denotes the corrected node admittance matrix, and $Y_{aux}$ denotes a correction matrix, expressed as follows.

$$Y_{aux} = \text{diag}\left(0, \ldots \frac{1}{j\overline{Z}_{LCC}} \ldots, \frac{1}{j\overline{Z}_{load}}, \ldots, \frac{1}{jX_d''}, \ldots 0\right) \quad (3)$$

In the Equation (3), diag(·) represents a transformation of a vector to a diagonal matrix; and in $Y_{aux}$, only a diagonal element corresponding to a node where the LCC is connected, a diagonal element corresponding to a node where the load is connected, and a diagonal element corresponding to a node where the synchronous generator is connected are non-zero, and the rest are all zero.

In an embodiment, the third data generation unit includes a fifth data acquisition module and a first processing module. The fifth data acquisition module is configured to acquire data of the grid-forming VSC node and data of the rated AC bus voltage grid-following VSC node. The first processing module is configured to remove the rows and the columns in the second admittance matrix to generate the third admittance matrix in real time.

In an embodiment, the third data generation unit includes a third calculation module. The third calculation module is configured to generate the third admittance matrix corresponding to the to-be-analyzed power grid by calculation through Equation (4).

$$Y_{final} = L_{delete}(Y_{exp}, k) \tag{4}$$

In the Equation (4), $Y_{final}$ denotes a final node admittance matrix, $Y_{exp}$ denotes the corrected node admittance matrix, k denotes a node number of the grid-forming VSC and the rated AC bus voltage VSC, and $L_{delete}$ represents a function to delete a k-th row and a k-th column from $Y_{exp}$.

In an embodiment, the fourth data generation unit includes a fourth calculation module and a fifth calculation module.

The fourth calculation module is configured to generate the Thevenin equivalent impedance data of the external system by calculation through Equation (5).

$$\overline{Z}_{th} = Y_{final}^{-1}(h, h) \tag{5}$$

In the Equation (5), $Y_{final}$ denotes a final node admittance matrix, and $\overline{Z}_{th}$ represents a Thevenin equivalent impedance of the external system, and is a h-th diagonal element in an inverse matrix of $Y_{final}$.

The fifth calculation module is configured to generate the voltage stiffness data of each of the plurality of VSC nodes by calculation through Equation (6).

$$K_{vtg} = \left| \frac{\overline{Z}_{device}}{\overline{Z}_{th} + \overline{Z}_{device}} \right| \tag{6}$$

In the Equation (6), $K_{vtg}$ denotes a voltage stiffness of each of the plurality of VSC nodes, $\overline{Z}_{device}$ is a device impedance of each of the plurality of VSC nodes, and $\overline{Z}_{th}$ is the Thevenin equivalent impedance of the external system.

In an embodiment, the fifth data generation unit includes a first determination module. The first determination module is configured to determine, in real time, whether the external system corresponding to the to-be-analyzed power grid is a strong system based on the strength evaluation data.

The specific details of steps involved in the method described in the embodiments have been explained above. Therefore, the functional modules in the above system configured to implement the steps or sub-steps in the method will not be repeated herein.

In the present disclosure, the first data corresponding to the to-be-analyzed power grid is acquired in real time, and is processed to generate the first admittance matrix corresponding to the to-be-analyzed power grid, where the first data is the basic planning data of the to-be-analyzed power grid, the first admittance matrix is the original node admittance matrix, the to-be-analyzed power grid includes the plurality of VSCs respectively corresponding to the plurality of VSC nodes, and the plurality of VSCs includes the grid-forming VSC and the rated AC bus voltage grid-following VSC; the first admittance matrix is processed to generate the device impedance data of each of the plurality of VSCs in the to-be-analyzed power grid and the second admittance matrix corresponding to the to-be-analyzed power grid, where the second admittance matrix is the corrected node admittance matrix; the rows and the columns where the grid-forming VSC node and the rated AC bus voltage grid-following VSC node are located are removed from the second admittance matrix to generate the third admittance matrix; the third admittance matrix is processed to generate the second data and the third data corresponding to each of the plurality of VSC nodes, where the second data is the Thevenin equivalent impedance data of the external system of each of the plurality of VSC nodes, and the third data is the voltage stiffness data of each of the plurality of VSC nodes; and the strength evaluation data corresponding to the to-be-analyzed power grid is generated based on the third data in combination with the second data. The definition and calculation method of voltage stiffness have been proposed for evaluating the voltage strength of VSC-penetrated power systems, so as to overcome the defects in the prior art. In addition, the voltage stiffness fully takes characteristic differences between VSCs and synchronous generators, thereby overcoming the disadvantage that the traditional short-circuit ratio is difficult to characterize the voltage support effect of the VSCs. Moreover, the voltage stiffness calculation is easy to implement and more suitable for practical engineering.

It should be noted that the embodiments described above are merely intended to illustrate the technical solutions of the present disclosure, and are not intended to limit the scope of the disclosure. Although the present disclosure is described in detail with reference to the embodiments, it should be understood that modifications or improvements made by those of ordinary skill in the art without departing from the spirit of the present disclosure shall fall within the scope of the present disclosure defined by the appended claims.

What is claimed is:

1. A method for evaluating strength of a voltage source converter (VSC)-penetrated power grid based on voltage stiffness, comprising:

step (1) acquiring a first data corresponding to a to-be-analyzed power gird in real time, and processing the first data to generate a first admittance matrix corresponding to the to-be-analyzed power grid; wherein the first data is basic planning data of the to-be-analyzed power grid, the first admittance matrix is an original node admittance matrix, the to-be-analyzed power grid comprises a plurality of VSCs respectively corresponding to a plurality of VSC nodes, and the plurality of VSCs comprises a grid-forming VSC and a rated alternating-current (AC) bus voltage grid-following VSC;

step (2) processing the first admittance matrix to generate device impedance data of each of the plurality of VSCs in the to-be-analyzed power grid and a second admittance matrix corresponding to the to-be-analyzed power grid; wherein the second admittance matrix is a corrected node admittance matrix;

step (3) removing rows and columns where a grid-forming VSC node and a rated AC bus voltage grid-following VSC node are located from the second admittance matrix to generate a third admittance matrix;

step (4) processing the third admittance matrix to generate a second data and a third data corresponding to each of the plurality of VSC nodes; wherein the second data is a Thevenin equivalent impedance data of an external system of each of the plurality of VSC nodes, and the third data is voltage stiffness data of each of the plurality of VSC nodes; and step (5) generating strength evaluation data corresponding to the to-be-analyzed power grid based on the third data in combination with the second data;

wherein the step (5) further comprises:

determining, in real time, whether the external system corresponding to the to-be-analyzed power grid is a strong system based on the strength evaluation data; wherein if the voltage stiffness data is greater than 0.95, the external system is regarded as the strong system.

2. The method of claim 1, wherein the step (1) further comprises:

acquiring network data for formulating the original node admittance matrix corresponding to the to-be-analyzed power grid;

acquiring location data, rated capacity data and sub-transient reactance data of each synchronous generator corresponding to the to-be-analyzed power grid;

acquiring location data, rated capacity data and control mode data of each of the plurality of VSCs in the to-be-analyzed power grid; and acquiring initial bus voltage magnitude data and apparent power data of each line-commutated converter (LCC) corresponding to the to-be-analyzed power grid.

3. The method of claim 1, wherein the step (2) further comprises:

generating the device impedance data of each of the plurality of VSCs in the to-be-analyzed power gird by calculation through equation (1):

$$\bar{Z}_{device} = \frac{U_{sys}^2}{\bar{S}_{device}^*}; \quad (1)$$

wherein in the equation (1), $\bar{Z}_{device}$ represents a device impedance of each of the plurality of VSCs, $U_{sys}$ represents a voltage magnitude after each of the plurality of VSCs is connected, and $\bar{S}^*_{device}$ represents a conjugate of an apparent power of each of the plurality of VSCs.

4. The method of claim 1, wherein the step (2) further comprises:

combined with a LCC, a load and sub-transient reactance data of each synchronous generator, generating the second admittance matrix corresponding to the to-be-analyzed power grid by calculation through equation (2):

$$Y_{exp} = Y_{org} + Y_{aux}; \quad (2)$$

wherein in the equation (2), $Y_{org}$ denotes the original node admittance matrix for power flow calculation, $Y_{exp}$ denotes the corrected node admittance matrix, and $Y_{aux}$ denotes a correction matrix; and the correction matrix is expressed as:

$$Y_{aux} = \text{diag}\left(0, \dots \frac{1}{j\bar{Z}_{LCC}} \dots, \frac{1}{j\bar{Z}_{load}}, \dots, \frac{1}{jX_d''}, \dots 0\right); \quad (3)$$

wherein in equation (3), diag(·) represents a transformation of a vector to a diagonal matrix; and in $Y_{aux}$, only a diagonal element corresponding to a node where the LCC is connected, a diagonal element corresponding to a node where the load is connected, and a diagonal element corresponding to a node where the synchronous generator is connected are non-zero, and the rest are all zero.

5. The method of claim 1, wherein the step (3) further comprises:

acquiring data of the grid-forming VSC node and data of the rated AC bus voltage grid-following VSC node.

6. The method of claim 1, wherein the third admittance matrix corresponding to the to-be-analyzed power grid is generated by calculation through equation (4):

$$Y_{final} = L_{delete}(Y_{exp}, k); \quad (4)$$

wherein in the equation (4), $Y_{final}$ denotes a final node admittance matrix, $Y_{exp}$ denotes the corrected node admittance matrix, k denotes a node number of the grid-forming VSC and the rated AC bus voltage VSC, and $L_{delete}$ represents a function to delete a k-th row and a k-th column from $Y_{exp}$.

7. The method of claim 1, wherein the step (4) further comprises:

generating the Thevenin equivalent impedance data of the external system by calculation through equation (5):

$$\bar{Z}_{th} = Y_{final}^{-1}(h, h); \quad (5)$$

wherein in the equation (5), $Y_{final}$ denotes a final node admittance matrix, and $\bar{Z}_{th}$ represents a Thevenin equivalent impedance of the external system, and is a h-th diagonal element in an inverse matrix of $Y_{final}$;

generating the voltage stiffness data of each of the plurality of VSC nodes by calculation through equation (6):

$$K_{vtg} = \left|\frac{\bar{Z}_{device}}{\bar{Z}_{th} + \bar{Z}_{device}}\right|; \quad (6)$$

wherein in the equation (6), $K_{vtg}$ denotes a voltage stiffness of each of the plurality of VSC nodes, $\bar{Z}_{device}$ is a device impedance of each of the plurality of VSC nodes, and $\bar{Z}_{th}$ is the Thevenin equivalent impedance of the external system.

8. A system for implementing the method of claim 1, comprising:
- a first data generation unit;
- a second data generation unit;
- a third data generation unit;
- a fourth data generation unit; and
- a fifth data generation unit;

wherein the first data generation unit is configured to acquire the first data corresponding to the to-be-analyzed power grid in real time, and process the first data to generate the first admittance matrix corresponding to the to-be-analyzed power grid; wherein the first data is the basic planning data of the to-be-analyzed power grid, the first admittance matrix is the original node admittance matrix, the to-be-analyzed power grid comprises a plurality of VSCs respectively corresponding to a plurality of VSC nodes, and the plurality of VSCs comprises a grid-forming VSC and a rated AC bus voltage grid-following VSC;

the second data generation unit is configured to process the first admittance matrix to generate the device impedance data of each of the plurality of VSCs in the to-be-analyzed power grid and the second admittance matrix corresponding to the to-be-analyzed power grid; wherein the second admittance matrix is the corrected node admittance matrix;

the third data generation unit is configured to remove the rows and the columns where the grid-forming VSC node and the rated AC bus voltage grid-following VSC node are located from the second admittance matrix to generate the third admittance matrix;

the fourth data generation unit is configured to process the third admittance matrix to generate the second data and the third data corresponding to each of the plurality of VSC nodes; wherein the second data is the Thevenin equivalent impedance data of the external system of each of the plurality of VSC nodes, and the third data is the voltage stiffness data of each of the plurality of VSC nodes;

the fifth data generation unit is configured to generate the strength evaluation data corresponding to the to-be-analyzed power grid based on the third data in combination with the second data; and the fifth data generation unit comprises a determination module, and the determination module is configured to determine, in real time, whether the external system corresponding to the to-be-analyzed power grid is the strong system based on the strength evaluation data; wherein if the voltage stiffness data is greater than 0.95, the external system is regarded as the strong system.

9. The system of claim 8, wherein the first data generation unit comprises a first data acquisition module, a second data acquisition module, a third data acquisition module and a fourth data acquisition module; the first data acquisition module is configured to acquire network data for formulating the original node admittance matrix corresponding to the to-be-analyzed power grid; the second data acquisition module is configured to acquire location data, rated capacity data and sub-transient reactance data of each synchronous generator corresponding to the to-be-analyzed power grid; the third data acquisition module is configured to acquire location data, rated capacity data and control mode data of each of the plurality of VSCs in the to-be-analyzed power grid; and the fourth data acquisition module is configured to acquire initial bus voltage magnitude data and apparent power data of each LCC corresponding to the to-be-analyzed power gird.

10. The system of claim 8, wherein the second data generation unit comprises a calculation module, and the calculation module is configured to generate the device impedance data of each of the plurality of VSCs in the to-be-analyzed power grid by calculation through equation (1):

$$\bar{Z}_{device} = \frac{U_{sys}^2}{\bar{S}_{device}^*}; \qquad (1)$$

wherein in the equation (1), $\bar{Z}_{device}$ represents a device impedance of each of the plurality of VSCs, $U_{sys}$ represents a voltage magnitude after each of the plurality of VSCs is connected, and $\bar{S}^*_{device}$ represents a conjugate of an apparent power of each of the plurality of VSCs.

11. The system of claim 8, wherein the second data generation unit comprises a calculation module, and the calculation module is configured, in combination with a LCC, a load and sub-transient reactance data of each synchronous generator, to generate the second admittance matrix corresponding to the to-be-analyzed power grid by calculation through equation (2):

$$Y_{exp} = Y_{org} + Y_{aux}; \qquad (2)$$

wherein in the equation (2), $Y_{org}$ denotes the original node admittance matrix for power flow calculation, $Y_{exp}$ denotes the corrected node admittance matrix, and $Y_{aux}$ denotes a correction matrix, expressed as:

$$Y_{aux} = \left(0, \ldots \frac{1}{j\bar{Z}_{LCC}} \ldots, \frac{1}{j\bar{Z}_{load}}, \ldots, \frac{1}{jX_d''}, \ldots 0\right); \qquad (3)$$

wherein in equation (3), diag(·) represents a transformation of a vector to a diagonal matrix; and in $Y_{aux}$, only a diagonal element corresponding to a node where the LCC is connected, a diagonal element corresponding to a node where the load is connected, and a diagonal element corresponding to a node where the synchronous generator is connected are non-zero, and the rest are all zero.

12. The system of claim 8, wherein the third data generation unit comprises a data acquisition module and a processing module; the data acquisition module is configured to acquire data of the grid-forming VSC node and data of the rated AC bus voltage grid-following VSC node; and the processing module is configured to remove the rows and the columns in the second admittance matrix to generate the third admittance matrix in real time.

13. The system of claim 8, wherein the third data generation unit comprises a calculation module, and the calculation module is configured to generate the third admittance matrix corresponding to the to-be-analyzed power grid by calculation through equation (4):

$$Y_{final} = L_{delete}(Y_{exp}, k); \qquad (4)$$

wherein in the equation (4), $Y_{final}$ denotes a final node admittance matrix, $Y_{exp}$ denotes the corrected node admittance matrix, k denotes a node number of the grid-forming VSC and the rated AC bus voltage VSC, and $L_{delete}$ represents a function to delete a k-th row and a k-th column from $Y_{exp}$.

14. The system of claim 8, wherein the fourth data generation unit comprises a first calculation module and a second calculation module; the first calculation module is configured to generate the Thevenin equivalent impedance data of the external system by calculation through equation (5):

$$\overline{Z}_{th} = Y_{final}^{-1}(h, h); \qquad (5)$$

wherein in the equation (5), $Y_{final}$ denotes a final node admittance matrix, and $\overline{Z}_{th}$ represents a Thevenin equivalent impedance of the external system, and is a h-th diagonal element in an inverse matrix of $Y_{final}$ final; and the second calculation module is configured to generate the voltage stiffness data of each of the plurality of VSC nodes by calculation through equation (6):

$$K_{vtg} = \left| \frac{\overline{Z}_{device}}{\overline{Z}_{th} + \overline{Z}_{device}} \right|; \qquad (6)$$

wherein in the equation (6), $K_{vtg}$ denotes a voltage stiffness of each of the plurality of VSC nodes, $\overline{Z}_{device}$ is a device impedance of each of the plurality of VSC nodes, and $\overline{Z}_{th}$ is the Thevenin equivalent impedance of the external system.

* * * * *